United States Patent [19]

Hoseney et al.

[11] 4,118,514

[45] * Oct. 3, 1978

[54] NONFAT DRY MILK SUBSTITUTE FOR YEAST-LEAVENED BAKED PRODUCTS

[75] Inventors: Russell C. Hoseney, Manhattan, Kans.; Rujira Srisuthep Ling, Toronto, Canada

[73] Assignee: Kansas State University Research Foundation, Manhattan, Kans.

[*] Notice: The portion of the term of this patent subsequent to Aug. 23, 1994, has been disclaimed.

[21] Appl. No.: 813,475

[22] Filed: Jul. 7, 1977

Related U.S. Application Data

[63] Continuation-in-part of Ser. No. 641,293, Dec. 16, 1975, Pat. No. 4,044,155.

[51] Int. Cl.$^2$ ............................................. A21D 2/02
[52] U.S. Cl. ...................................... 426/62; 426/23; 426/583; 426/653
[58] Field of Search ................... 426/21, 23, 26, 653, 426/583, 62

[56] References Cited

U.S. PATENT DOCUMENTS 4,044,155  8/1977  Hoseney et al. ........................ 426/62

*Primary Examiner*—Joseph M. Golian

*Attorney, Agent, or Firm*—Schmidt, Johnson, Hovey & Williams

[57] ABSTRACT

A low-cost substitute for nonfat dry milk (NFDM) solids is provided which serves as a functional equivalent of NFDM in yeast-leavened doughs used in bread making or the like, in terms of desirable organoleptic properties such as loaf volume, crumb quality and crust color. The substitute comprises a component such as an ammonium salt which serves as a source of ammonium ion in the dough, and a quantity of deproteinized whey; these components have been shown to synergistically maintain or enhance loaf volumes while giving good crust color and crumb quality, notwithstanding the fact that deproteinized whey alone has deleterious effect when used alone in doughs. In preferred forms, the substitute serves as both a functional and at least a partial nutritional replacement for NFDM in yeast-leavened doughs, but is much lower in cost and can be used without difficulty in both batch and continuous bread making processes. The substitute is advantageously incorporated into NFDM-free yeast-leavened doughs at levels for increasing loaf volume and other organoleptic properties of baked goods derived from the doughs; however, the substitute can also be used to good effect in doughs containing reduced levels of NFDM solids.

8 Claims, No Drawings

NONFAT DRY MILK SUBSTITUTE FOR YEAST-LEAVENED BAKED PRODUCTS

This application is a continuation-in-part of application Ser. No. 641,293 filed Dec. 16, 1975, and entitled "NONFAT DRY MILK SUBSTITUTE FOR YEAST-LEAVENED BAKED PRODUCTS" now U.S. Pat. No. 4,044,155.

This invention relates to a nonfat dry milk substitute especially adapted to be incorporated into yeast-leavened doughs such as those used in bread making, and which is low in cost and usable both in conventional batch-type and continuous bread making operations. More particularly, it is concerned with a two-component NFDM substitute and method of use thereof which provides a source of ammonium ion to the yeast-leavened dough, along with a quantity of deproteinized whey. Surprisingly, it has been found that the two-component substitute gives a final product which is essentially identical from an organoleptic standpoint to products supplemented with NFDM solids.

The use of nonfat dry milk solids in yeast-leavened products is well-known in the baking industry. For example, commercial bread bakers have heretofore incorporated NFDM solids into bread dough for enhancing organoleptic properties such as loaf volume, crust color and crumb quality of their breads. In addition, use of NFDM solids has the additional advantage that it substantially boosts the nutritive value of the breads. In practice, NFDM solids have been used at levels up to about 6% (baker's weight) in a wide variety of yeast-leavened baked goods. However, certain problems have been encountered in using NFDM solids in continuous and short-time bread making processes, i.e., the milk supplemented doughs are slack or weak, require long proofing times, and the breads derived therefrom sometimes exhibit poor loaf volume and an open grain.

In any event, the rising cost of milk products of all kinds has led in recent years to a decrease in the use of NFDM solids by the baking industry, and in particular the use of such solids in breads. In fact, this cost factor has led many bakers to completely eliminate the use of NFDM solids even in batch-process breads, even though the resultant milk-free products are inferior in terms of organoleptic properties as compared with those produced with the milk solids. As can be appreciated, a definite commercial advantage could be obtained if a low cost substitute for NFDM could be used which would serve as at least a functional replacement for NFDM solids; furthermore, if such a substitute approached or exceeded milk solids from a nutritional standpoint as well, the additional advantages would be considerable. Finally, if the substitute could be used to good effect in the various types of bread making processes, a truly significant advance could be realized.

As is well known in the dairy processing industry, from about 6 to 9 pounds of whey is produced as a by-product from the production of one pound of cheese. Wheys are generally classed as either sweet, i.e., that produced when whole milk is used in cheese making, or acid, when skim milk is employed in cheese making. In dealing with the relatively large amounts of whey produced, it has been known to make whey protein concentrates which can be prepared from a number of processes including electrodialysis, ultrafiltration, and complexing with metaphosphate. The protein produced by such processes has been found to be useful in many food products. However, the remaining fraction of deproteinized whey, which contains the bulk of the lactose along with various salts and vitamins found in whole whey, has not been utilized in the food processing industry to any appreciable extent, and in fact represents a serious pollution problem to cheese producers.

A number of attempts have been made to incorporate whole, as opposed to deproteinized, whey into bread dough formulations as a substitute for nonfat dry milk solids normally used therein. See, for example, U.S. Pat. Nos. 3,061,442, 3,445,238 and 3,525,627. However, these attempts have achieved little commercial success since the resultant products do not exhibit organoleptic properties approaching those of NFDM supplemented products.

It is therefore the most important object of the present invention to provide a substitute for nonfat dry milk solids which is low in cost and especially adapted for incorporation into all types of yeast-leavened doughs in order to serve as a functional replacement for NFDM solids, and which finds special utility in both batch-type and continuous bread making processes without deleteriously affecting the organoleptic properties of the resultant baked products.

As a corollary to the foregoing, another object of the invention is to provide a two-component NFDM substitute for yeast-leavened bread doughs and the like which includes as a component thereof a compound such as an ammonium salt which serves as a source of ammonium ion in the dough, along with a quantity of deproteinized whey; the substitute is preferably incorporated into doughs prior to baking thereof in amounts for enhancing loaf volume and other desirable organoleptic properties of the baked goods.

A still further object of the invention is to provide an NFDM substitute of the type described which may also include a protein supplement such as a soy isolate, so that the resultant substitute serves as an effective functional and nutritional replacement for nonfat dry milk solids in bread doughs or the like.

It has been known in the past to use an ammonium salt such as NH$_4$Cl in yeast foods sometimes added in small amounts to bread doughs. See, e.g., U.S. Pat. No. 3,061,442. However, the use of ammonium salts in these types of applications is generally very minor and the salts are not present in amounts for significantly enhancing the organoleptic properties of the resultant breads. Additionally, British Pat. No. 137,365 discloses the use of somewhat larger quantities of ammonium salts in bread doughs for the purpose of improving yeast-leavened doughs.

It has also been discovered that deproteinized whey, when added to bread doughs and the like, depresses loaf volumes. This in itself is surprising since in a paper entitled "A Whey Protein Contributing to Loaf Volume Depression" (Cereal Chem., vol. 52, p. 188 ff., 1975) it was asserted that whey protein caused loaf volume depression. Thus, it would be logical to assume that whey which was free of protein would not depress loaf volume. Furthermore, in a paper entitled "Lactose in Bakery Products, — An Update", (Baker's Digest, vol. 51(1), p. 21 ff., 1977), it was demonstrated that lactose increased loaf volumes. Hence, since lactose is the major component of deproteinized whey, it would be expected that the latter would in fact increase, rather than decrease, loaf volumes.

In its broadest aspects, the present invention is concerned with providing a low cost, effective NFDM substitute for incorporation into yeast-leavened doughs. In this regard, it has been discovered that two components, i.e., deproteinized whey and an ammonium ion source, operate in a synergistic fashion to give a substitute which is functionally equivalent with NFDM solids; moreover, the whey serves as at least a partial nutritional substitute for the milk solids.

In preferred baking or bread-making procedures, the substitute (or the individual components thereof) is simply incorporated into a yeast-leavened dough in the usual manner, as a substitute for NFDM solids. The substitute hereof can be used in batch, short-time, no-time and continuous bread making procedures without deleterious results, and the substitute-supplemented doughs can be handled, proofed and baked in the well known manner without any specialized techniques.

In more detail, it has been determined that the ammonium ion-providing substance should be used at a level to provide from about 0.02 to 0.20% (baker's weight) of ammonium ion to the resultant dough, and more preferably from about 0.027 to 0.10% (baker's weight) of ammonium ion. In terms of organoleptic properties, sufficient ammonium ion should preferably be present in the dough to increase the volume of the resultant baked goods (such as loaf volume in bread) at least about 5% over the volume of goods derived from an otherwise identical dough free of NFDM solids and the substitute hereof.

Although a wide variety of substances can be employed as ammonium ion sources in the substitutes of the invention, the substance is preferably selected from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

The nonfat dry milk substitute in accordance with the invention also includes a quantity of deproteinized whey which adds lactose and various vitamins and minerals to the substitute. In addition, use of deproteinized whey in this fashion in large measure solves a disposal problem faced in cheese processers while at the same time providing a salable product. The makeup of an exemplary whole sweet whey is set forth in Table I.

As can be seen, even when the protein fraction of whey is removed, substantial nutrients remain.

As noted, the elements of the preferred milk substitute can be premixed and added to a dough formulation together, or incorporated individually into the dough. In preferred forms the deproteinized whey is added to the dough at a level up to about 2.5% (baker's weight), and more preferably within the range of from about 1.8 to 2.2% (baker's weight). In terms of a preferred premixed substitute, the latter should contain a sufficient quantity of an ammonium ion source to provide from about 1.0 to 10% by weight ammonium ion on a calculated basis in the substitute, and more preferably from about 1.35 to 5.0% by weight ammonium ion. In many cases when ammonium salts are employed, from about 25 to 70% by weight of the ion-providing salt is used. In any case the deproteinized whey should be present in a premixed substitute at a level of from about 30 to 75% by weight.

Although in most cases the bread or other baked yeast-leavened goods in accordance with the invention will be essentially free of nonfat dry milk solids (because of the cost thereof), the invention is not so limited. In particular, a dough formulation normally employing NFDM solids in order to impart particular organoleptic properties such as loaf volume and crust color to the baked goods may be modified by using a quantity of milk solids therein which is up to about 100% less than the amounts of solids employed to give such baked goods the particular organoleptic properties strived for. In these situations the nonfat dry milk substitute hereof is incorporated into the dough formulation in lieu of the omitted NFDM solids preferably in an amount for contributing a quantity of ammonium ion to the formulation which is sufficient to maintain the particular organoleptic properties of the baked goods at a level at least substantially equal to those of baked goods derived from an otherwise identical dough formulation containing the amount of NFDM solids and being free of the milk substitute. In preferred forms, the quantity of NFDM solids is reduced by a factor of from about 50 to 100% relative to the amount normally employed in the dough formulation.

The following example illustrates the present invention, but nothing therein should be taken as a limitation upon the scope of the latter.

EXAMPLE

This test was conducted to determine the effects on bread of adding a two-component NFDM substitute comprising deproteinized whey and an ammonium ion source. The baking tests were carried out as described below with ammonium hydroxide being used as the ion source. In each case the deproteinized whey and NH₄OH were added separately and simply incorporated into the dough in the conventional manner.

The bread in each test was produced using a straight dough procedure with the following formula:

TABLE I

| Component | % by Weight |
| --- | --- |
| Protein | 12.9 |
| Fat | 1.1 |
| Ash | 8.0 |
| Lactose | 4.5 |
| Water | 73.5 |
| Total | 100.0 |

| Component | mg/100g of Whey |
| --- | --- |
| Thiamine | 0.50 |
| Riboflavin | 2.50 |
| Niacin | 0.80 |
| Biotin | 0.40 |
| Panothenic acid | 4.80 |
| Folic acid | 0.09 |
| Choline | 200.0 |
| Ca | 6.46 |
| Fe | 1.40 |
| Mg | 130.0 |
| P | 589.0 |
| K | — |
| Na | 700.0 |
| Vitamin A | 50 I. U. |

TABLE II

| | |
| --- | --- |
| Flour | 100 g (14% M. B.) |
| Sugar | 6 |
| Salt | 1.5 |
| Vegetable shortening | 3.0 |
| Malt syrup 60° L | 0.5 |
| Yeast | 2.0 |
| Potassium Bromate | Optimum |
| Water | Optimum |

The doughs were mixed to optimum, fermented at 30° C. and 90% relative humidity for 180 minutes, with mechanical punching after 105 and 155 minutes. The doughs were then machine molded and proofed for 55 minutes and baked at 218° C. for 25 minutes. Within 3 minutes after removing from the oven, the loaf volume was determined by the rapeseed displacement method. For any set of conditions sufficient loaves were baked to determine optimum water and potassium bromate in the formula. All test additives were directly mixed as dry granulations.

The results of this series of tests, along with the types and amounts of additives used, are set forth in the following Table:

TABLE

| Test No. | [1]NFDM | [1]Deproteinized Whey | [1]$NH_4OH$ | [2]Loaf Vol. | [2]Change in Loaf Vol. | % Change in Loaf Vol. | Crust Color | Crumb Quality |
|---|---|---|---|---|---|---|---|---|
| Control 1 | — | — | — | 900 | — | — | Pale | — |
| Control 2 | 4.0 | — | — | 1000 | +100 | +11.1 | Brown | + |
| Control 3 | — | 2.1 | — | 850 | − 50 | − 5.5 | Brown | − |
| Control 4 | — | — | 0.2 | 990 | + 90 | 10.0 | Pale | + |
| Control 5 | — | 2.1 | 0.2 | 990 | + 90 | 10.0 | Brown | + |

[1]Data given in % baker's weight.
[2]Data given in cubic centimeters.

A perusal of the results given in the Table will demonstrate the effectiveness of the NFDM substitute hereof, as well as the unexpected synergism between the components thereof. First of all, it will be seen that the addition of deproteinized whey and $NH_4OH$ essentially matches the functionality of NFDM solids in terms of loaf volume, crust color and crumb quality. Therefore, since the cost of the substitute is much less than that of NFDM solids, the utility thereof is manifest.

Attention is specifically directed to tests Nos. 3–5 in the Table. In test No. 3 only deproteinized whey was employed as an additive, and this resulted in a statistically significant decrease in loaf volume relative to both the control and NFDM supplemented breads. In test No. 4 using only $NH_4OH$, loaf volume was essentially identical to the NFDM bread. Thus, it would be expected that use of volume-depressing deproteinized whey and $NH_4OH$ in combination would give a volume result higher than that of the whey-only test, but definitely lower than that of the $NH_4OH$ test. Contrary to these expectations however, the two-component additive (test No. 5) gave a volume result identical to that of the $NH_4OH$-only test. Thus, it is clear that the use of ammonium ion and deproteinized whey in combination does not give a simple additive result, but in fact these two components cooperate in a synergistic fashion in a yeast-leavened dough system. It is also to be observed that color and crumb quality results with the additive hereof are equivalent to those achieved with NFDM solids, and that these results are not duplicated in either the $NH_4OH$-only or deproteinized whey-only tests.

Having thus described the invention, what is claimed as new and desired to be secured by Letters Patent is:

1. A functional substitute for nonfat dry milk in yeast-leavened dough, said substitute comprising from about 30 to 75% by weight of deproteinized whey and an amount of a substance which serves as a source of ammonium ion in said dough, said substance being present at a level to provide from about 1 to 10% by weight of ammonium ion on a calculated basis in said substitute.

2. The nonfat dry milk substitute of claim 1 wherein said level of said ammonium ion is from about 1.35 to 5.0% by weight on a calculated basis.

3. The nonfat dry milk substitute of claim 1 wherein said substance includes a compound selected from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

4. The nonfat dry milk substitute as set forth in claim 1 wherein said substance is an ammonium ion salt, and said salt is present at a level of from about 20 to 70% by weight.

5. A yeast-leavened dough comprising respective quantities of flour, water and yeast, said dough having incorporated therein a nonfat dry milk substitute, said substitute comprising from about 30 to 75% by weight of deproteinized whey and an amount of a substance which serves as a source of ammonium ion in said dough, said substance being present at a level to provide from about 1 to 10% by weight of ammonium ion on a calculated basis in said substitute, said dough containing up to 2.5% (baker's weight) deproteinized whey and about 0.02 to 0.20% (baker's weight) of ammonium ion.

6. The dough as set forth in claim 5 wherein said substance includes a compound selected from the group consisting of ammonia, ammonium hydroxide, ammonium carbonate, ammonium bicarbonate, ammonium dihydrogen phosphate, diammonium hydrogen phosphate, triammonium phosphate, ammonium chloride, ammonium sulfate, ammonium bisulfate, the ammonium salts of weak organic acids and mixtures thereof.

7. The dough as set forth in claim 5 wherein said whey is present at a level of from about 1.8 to 2.2% (baker's weight).

8. The dough as set forth in claim 5 wherein said dough is essentially free of nonfat dry milk solids.

* * * * *